United States Patent [19]

Cannon

[11] 4,218,611

[45] Aug. 19, 1980

[54] METHOD AND APPARATUS FOR CONTROLLING EATING BEHAVIOR

[75] Inventor: Thomas G. Cannon, Bellvue, Colo.

[73] Assignee: Trendmark Corporation, Ft. Collins, Colo.

[21] Appl. No.: 906,460

[22] Filed: May 17, 1978

Related U.S. Application Data

[62] Division of Ser. No. 712,548, Aug. 9, 1976.

[51] Int. Cl.$^2$ .......................... G06M 3/06; G08B 5/36
[52] U.S. Cl. .............................. 235/92 T; 235/92 MS; 235/92 DE; 340/309.1
[58] Field of Search ........... 235/92 T, 92 EA, 92 MS, 235/92 DE, 92 FP; 340/331, 323 R, 309.1, 309.4

[56] References Cited

U.S. PATENT DOCUMENTS

| | | | |
|---|---|---|---|
| 3,619,576 | 11/1971 | Cauthen et al. | 235/92 FP |
| 3,636,549 | 1/1972 | Berman et al. | 235/92 T |
| 3,729,620 | 4/1973 | Jones | 235/92 FP |
| 3,735,101 | 5/1973 | Stewart | 235/92 T |
| 3,789,402 | 1/1974 | Heywood et al. | 340/331 |
| 3,882,480 | 5/1975 | Greber | 340/323 R |
| 3,901,121 | 8/1975 | Kleiner | 340/331 |
| 3,934,240 | 1/1976 | Norling | 340/309.1 |
| 3,973,251 | 8/1976 | Stephans | 340/309.1 |
| 4,052,799 | 10/1977 | Journot | 235/92 T |

Primary Examiner—Joseph M. Thesz
Attorney, Agent, or Firm—Hugh H. Drake

[57] ABSTRACT

A method and apparatus for controlling a person's eating behavior uses a counter on the table next to the food being eaten. The counter displays the number of bites to be taken at each meal, displays the actual number of bites while the bites are being taken during a meal, provides a cadence signal from which the person can pace his chewing rate, determines the size of the bite taken and the time between bites, and provides an exercise between bites which forces the person to break the eating chain by pushing a button to increment the counter.

19 Claims, 3 Drawing Figures

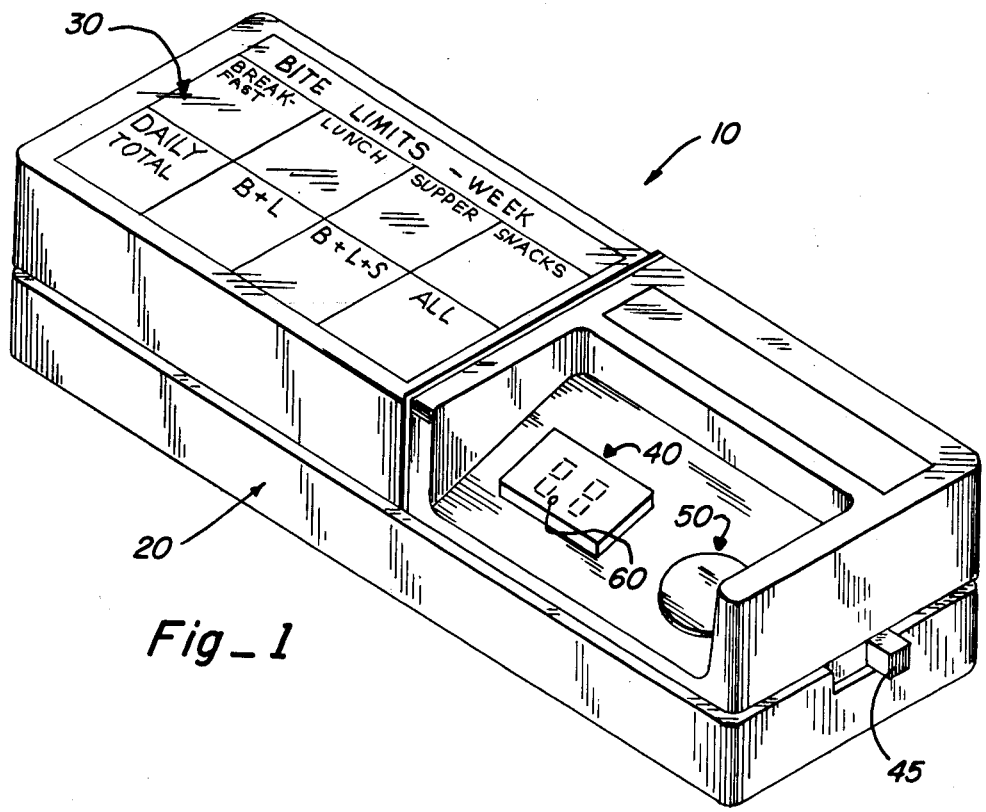
Fig_1
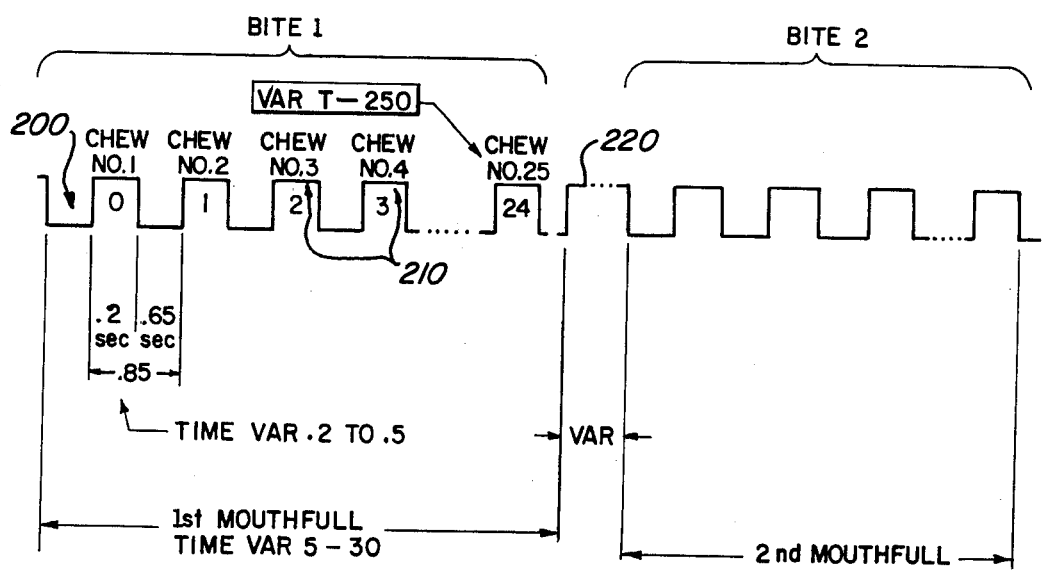
Fig_2

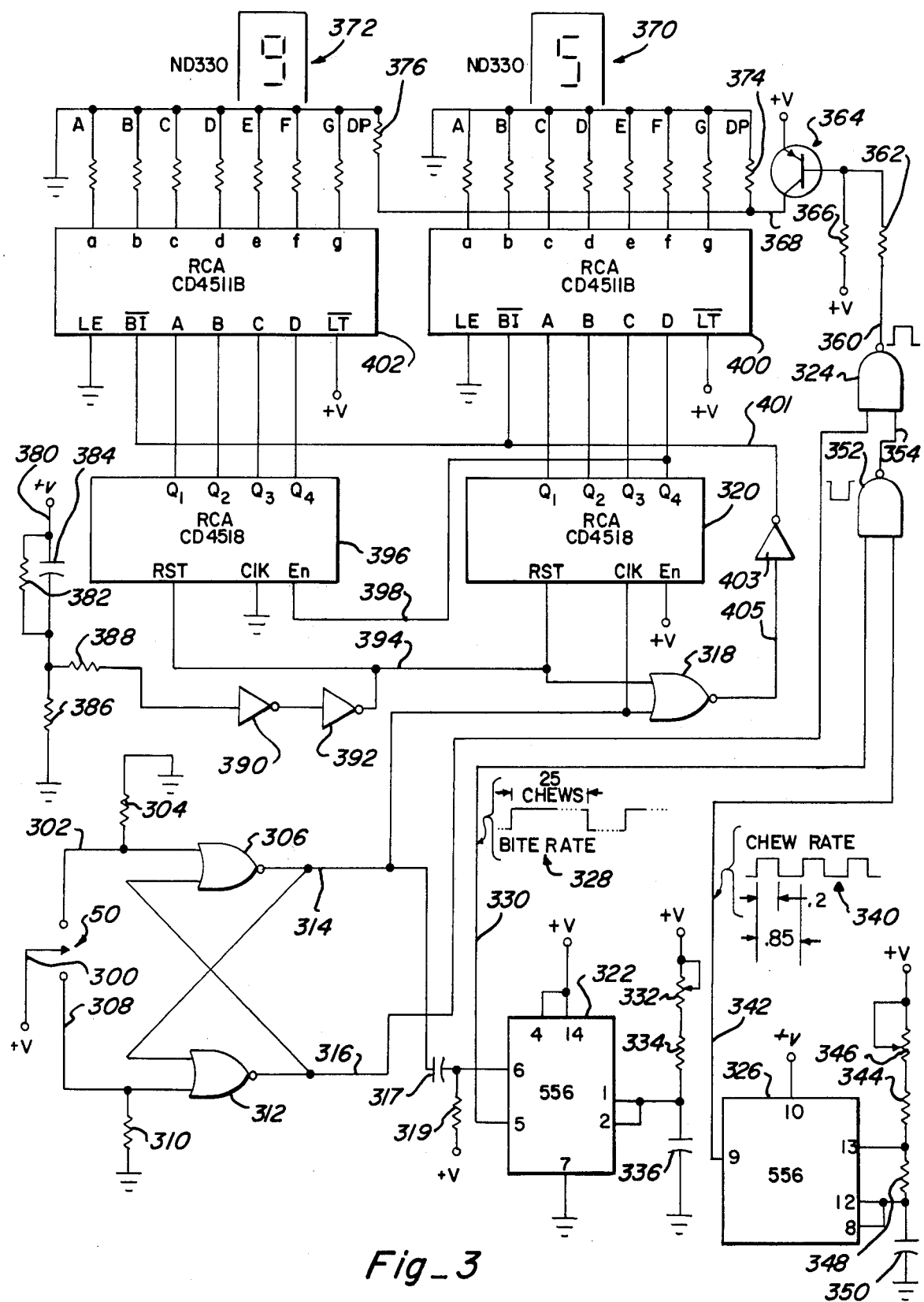
Fig_3

METHOD AND APPARATUS FOR CONTROLLING EATING BEHAVIOR

RELATED APPLICATION

This is a division of co-pending parent application Ser. No. 712,548, filed Aug. 9, 1976 and assigned to the same assignee as the present application.

BACKGROUND OF THE INVENTION

1. Field of the Invention

The present invention relates generally to methods and apparatus for controlling the eating by a person and more particularly to methods and apparatus for controlling eating by a person based on behavioral control principles.

2. Description of the Prior Art

Numerous approaches, methods, devices, and drugs have been suggested and utilized in the past to control the weight of the human being. None of the above such prior art approaches, however, have been so effective in maintaining long term weight reduction as the prior art approach hereinafter referred to as "behavioral control".

"A Review of Behavioral Approaches to Weight Control" by Edward E. Abramson. *Behavior Research and Therapy*, Vol. II, pages 547 to 556, 1973.

In 1962, it was suggested that the application of reinforcement theory to the behavior of human eating would be an effective approach for losing weight and for maintaining the weight loss over a long period of time, "The Control of Eating" by Ferster, C. B.; Nurnberger, J. I.; & Levitt, E. B. *The Journal of Mathetics*, Vol. 1, pages 87-109, 1962.

Ferster suggested that if an individual would gain control of the factors which determine "how often" and "how much" one eats, then weight loss could be accomplished. The importance of lengthening the chain of responses leading to swallowing of food in order to weaken the disposition to start the chain of eating is discussed to reduce the frequency with which eating is carried out. Various exercises are suggested to lengthen the chain, such as placing food on the fork only after other food is swallowed and the mouth is empty, interrupting the meal for increasing amounts of time, and prolonging chewing before swallowing for increasing periods.

Persons have generally been observed to eat rapidly whenever they eat, so that large quantities of food are consumed in brief periods. To slow the process of ingestion, it has been recommended to place a small amount of food in the mouth and to replace the utensils on the table until the food is swallowed.

"Behavior Control of Overeating" by Richard B. Stuart. *Behavioral Research and Therapy*, Vol. 5, pages 357-365, 1976.

By eating more slowly, and lengthening the chain of responses, the person generally improves digestion, eliminates indigestion, and eventually achieves a normal state of satiation with less food intake. Satiation is accomplished since it normally takes at least 15-20 minutes after beginning to eat before a person begins to feel the effects of food.

*The Behavioral Control of Overeating* by James M. Shulman, M. A. Thesis, Univ. of Montana, 1971.

The two aforesaid references, therefore, recommend a set of exercises to break up the chain of eating and to lengthen the meal time by replacing the silverware on the table after placing food in the mouth and by chewing food slowly. Shulman further suggests that during the latter part of the meal when hunger is not as potent as earlier, a person should take a 2-5 minute break. A physiological factor in satiation may be increased mastication.

"Relationship Between Eating Rates and Obesity" by Gaul, D. J.; Craighead, W. E.; & Mahoney, M. J., *J. of Consulting and Clinical Psychology*, Vol. 43, No. 2, pages 123-125, 1975.

It has now been firmly established that one who eats rapidly might overeat and gain weight because he ingests a large "excess" of food between the time he is full and the time the satiety mechanism inhibits eating.

"Eating Responses of Obese and Nonobese Humans during Dinner Meals" by Hill, S. W. & McCutcheon, N. B., *Psychosomatic Medicine*, Vol. 37, No. 5, Sept.-Oct., pages 395-401, 1975.

Obese people clearly eat slightly larger bites (grams per bite) and chew slightly faster or with less chewing per bite than non-obese people.

In addition to breaking up and lengthening the chain of eating leading to satiation, another behavioral control factor is observed to be found in decreasing the quantity of food taken in by reducing the number of mouthfuls per meal. Shulman recommended that each week for ten weeks the number of actual mouthfuls of food per meal should be recorded so that an average number of mouthfuls per meal could be determined. Shulman suggested that a goal of a predetermined number of less mouthfuls per meal would result in a slow and gradual weight loss. One prior art behavioral approach to weight reduction is termed "simple self-management".

"Permanence of Two Self-Managed Treatments of Overweight in University and Community Populations" by Hall, S. M.; Hall, R. G.; Hanson, R. W.; & Borden, B. L., *J. of Consulting and Clinical Psychology*, Vol. 42, No. 6, pages 781-786, 1974.

The method and apparatus taught by the Hall "simple self-management" approach is to monitor the number of bites of food ingested per day and to record this daily on data sheets. The users were then given a Borm wrist response counter to record bites of food taken. The average number of bites per day were then decreased weekly by three. At the end of two weeks, if the user had lost 1-2 pounds per week for both weeks, he was instructed to keep the bites per day at the average level for the previous week. If a loss of this magnitude had not occurred, the user was instructed to decrease his bites per day by three until he was losing 1-2 pounds per week for two successive weeks. If at any time a subject lost more than two pounds per week for two successive weeks, he increased the number of bites per day by three until no more than two pounds per week were lost.

Other experimental results indicate that the additional factor of feedback may be important in weight control.

"A Comparison of Two Forms of Self-Monitoring in a Behavioral Weight Reduction Program" by Bellack, A. S.; Rozensky, R.; & Schwartz, J. *Behavior Therapy*, Vol. 5, pages 523-530, 1974.

Specifically, each person was required to record prior to eating the amount, time, and place of eating. Persons doing this pre-behavior step lost more weight than those who reported such information after eating. Feedback which apparently does not effect self-monitoring of weight control is daily measuring of weight.

"Self-Monitoring in the Treatment of Obesity: Parameters of Reactivity" by Raymond G. Romanczyk, *Behavior Therapy*, Vol. 5, pages 531–540, 1974.

However, prompting or reminding oneself of the end result of losing weight such as monitoring caloric intake does have a significant effect. Id. This has been termed "self-cueing". It has been observed that, by increasing the "rate of self-cueing", significant results would be obtained.

Unfortunately, obese individuals are significantly less accurate in self-monitoring than non-obese individuals.

"Relationship Between Eating Rates and Obesity" by Gaul, D. J.; Craighead, W. E.; & Mahoney, M. J., *J. of Consulting and Clinical Psychology*, Vol. 43, No. 2, pages 123–125, 1975.

When asked to reduce the number of bites, obese individuals generally reduce the bites but increase the amount and the speed of the bites.

The importance of using a counting device in conducting experiments on behavioral change has been recognized in clinical analysis as an effective research tool and the reactive effects of such recording leads to behavioral changes primarily because of the counting and recording activity.

"Why Not Give Your Clients a Counter: A Survey of What Happened When We Did", Zimmerman, J. and Levitt, E. E. *Behavioral Research and Therapy*, Vol. 13, pages 333–337, 1975.

Unfortunately, prior art attempts to count the number of chews per bit has turned out to be a rather tedious and difficult task as a cueing strategy. Id. at 125. Furthermore, while many prior art solutions have been suggested for slowing the pace of eating, all of them have a critical common element—namely, each must make you more aware of your eating. It has been suggested to eat with unusual utensils such as chop sticks or to eat with a non-dominate hand, to swallow your bite before putting the next item on your fork, and to actually put the utensils or sandwich down between bites. These are often dramatic changes in the eating habits and reminders have been employed to aid in reconditioning the person. A bandage placed on the finger or some special cue on the hand has been used. Even signs such as "SLOW DOWN" have been placed next to the plate.

None of the above prior art approaches have considered or suggested a unified method and apparatus for weight reduction, maintenance, or gain based on behavioral control principles such as:

(1) Lengthening the chain of eating,
(2) Satiation of hunger with less food by increasing meal length.
(3) Decreasing the amount of food, and
(4) Feedback or self-cueing.

The method and apparatus of the present invention provides, for the first time, such a unified approach designed for the consuming public.

Specifically, the method and apparatus of the present invention provides a highly visible physical "aid" in the form of a counter/pacer and display. At each meal, the physical appearance of the apparatus of the present invention provides feedback to the mind of the user that he is to be concentrating on losing, maintaining, or gaining weight. The physical presence of this counter and display on the table visibly stands apart from other common table items.

Specifically, the present invention requires the user to first determine his average number of bites per meal using the apparatus of the present invention. Once the average number of bites per meal has been determined, the user records the desired weekly goal on the counter and display of the present invention. The average weekly goal to lose weight is generally one bite less per meal than that initially determined. The weight loss over a week-by-week period should be according to that taught by the Hall "Simple Self-Management Approach". (That is, 1–2 pounds per week should be the average weekly loss.) If greater than 1–2 pounds per week is observed, then the average number of bites per meal is increased, if no weight loss is recorded on a weekly basis, then an additional bite is subtracted from the daily average. The act of visibly displaying the average daily bites at the start of the week and constantly having the average daily bites per meal displayed while eating provides a "self-cueing" of weight control. Weight maintenance and weight gain is accomplished by maintaining or increasing the bites per meal, respectively.

While eating each meal, the user of the present invention presses a button before each bite, the pressing of the button increments a counter which causes a visible display to be activated displaying the number of the bite being taken. When the button is released, a light flashes to provide a cadence from which the user is conditioned to chew at the cadence rate. A steady indication of the light is made, informing the user that his bite was too large if the user had not finished his bite in a predetermined time interval. If the user has not taken a large enough bite, then he is finished chewing and swallowing prior to the steady light indication. If this happens, the user must take a larger bite the next bite. Furthermore, the user must wait until the light becomes steady and then push the button prior to taking the next bite. Pressing the button before the light becomes steady will not advance the counter. This sequence of events lengthens and interrupts the eating chain, enables greater satiation to occur for the amount of food consumed, provides, for the first time, a convenient means for keeping uniform the amount of food in each bite, and provides continuous self-cueing feedback to the user. None of the above prior art approaches suggest or disclose such an approach. Indeed, none of the above approaches suggests or discloses a means for pacing the chewing rate of each bite or controlling the size of food in each bite.

OBJECTS OF THE INVENTION

It is an object of the present invention to provide a new and novel method for controlling the eating behavior of individuals.

It is another object of the present invention to provide a new and novel method for controlling eating behavior in which each bite of food is chewed in cadence to a repetitive signal.

It is another object of the present invention to provide a new and novel method for controlling eating behavior comprising the steps of increasing the amount of food in the next bite when the previous bite was swallowed prior to an indication raised when a predetermined time has elapsed and decreasing the amount of food in the next bite when the previous bite was swallowed after said indication appeared.

It is another object of the present invention to provide a new and novel method for controlling the eating behavior of individuals comprising the steps of determining the desired number of bites per meal, displaying the desired number of bites on a table in full view while eating, incrementing a counter in response to placing a bite of food into the mouth, comparing the cumulative number of bites displayed by said counter to the desired number, chewing each bite of food in cadence to a repetitive signal, controlling the elapsed time between bites and stopping eating when the cumulative number of bites equals the desired number of bites.

It is another object of the present invention to provide a new and novel apparatus for use by a person in controlling eating behavior comprising means responsive to the start of chewing a bite of food for providing a repetitive signal to the person wherein the person chews a bite of food in cadence with the signal.

It is another object of the present invention to provide a new and novel apparatus for use by a person in controlling eating behavior wherein said apparatus comprises means operative upon an indication from the person for generating an output when the person is ready to start chewing a bite of food, means receptive of the output for providing a repetitive signal to the person so that the person can chew the bite in cadence with the repetitive signal, means cooperative with the providing means for deactivating the repetitive signal when a predetermined time interval has elapsed, and means operative upon the indication from the person for displaying the cumulative number of bites taken.

SUMMARY OF THE INVENTION

The present invention pertains to a method and apparatus for controlling eating behavior based upon behavioral principles for long-term weight loss and maintenance. The user of the present invention determines the average number of bites per meal over a several day period. The average bites for breakfast, lunch, supper, and snacks are calculated. One bite from each meal per day is subtracted from the average amount and this is termed the "bite limit" for the meal. The "bite limit" for the meal is entered and visibly displayed on the counter of the present invention and is adhered to for a week.

During each meal, the user of the present invention presses a button before taking the next bite. The pressing of the button increments a counter which displays the cumulative total of bites for that meal. Twenty-five chews are allowed in the preferred embodiment for each bite. The user chews in cadence with a flashing light and if the user finishes a bite before a steady indication comes on, he must take a larger amount for the next bite. If the user is still chewing when the steady indication comes on, then he has taken too large an amount for that bite and must reduce the amount for the next bite. The user who completes chewing before the steady indicator comes on must wait until the steady indication appears before incrementing the bite counter.

The behavior control apparatus of the present invention comprises a body proper having sufficient space for recording the bite limit for breakfast, lunch, supper, and snacks as well as the daily total. Furthermore, a digital display is provided for displaying the cumulative total of bites during each meal as well as providing a cadence light for pacing the user. The display and cadence light are driven by a control circuitry activated by the push button which is activated before chewing each bite.

Other objects, advantages and capabilities of the present invention will become more apparent as the description proceeds, taken in conjunction with the accompanying drawings.

DESCRIPTION OF THE DRAWINGS

FIG. 1 is a perspective view of the eating behavior control apparatus of the present invention.

FIG. 2 is a graphical representation of the timing relationship of the eating behavior control apparatus of FIG. 1.

FIG. 3 is the electronic circuitry of the preferred embodiment of the control circuitry of the present invention.

DESCRIPTION OF THE PREFERRED EMBODIMENT

The eating behavior control apparatus 10 of the present invention is shown in FIG. 1 to include a housing proper 20 for enclosing the electronics of the present invention and a chart 30 for recording the average bite limit on a weekly basis for breakfast, lunch, supper and snacks. Provision may be optionally made for entering the actual daily total at breakfast, lunch, and supper on the chart 30. A two-digit seven-segment display 40 is provided for displaying the number of bites taken during a given meal. A push button 50 is provided for activating the eating behavior control apparatus 10 of the present invention whenever the next bite is taken. An ON-OFF switch 45 is provided for powering the apparatus 10.

In operation, the user of the eating behavior control apparatus 10 of the present invention would, in the manner and method to be described, determine his average number of bites for breakfast, lunch, and supper as well as any snacks, subtract one bite per meal and enter that amount on the recording sheet for week 1. At each meal, the user would limit the number of bites to the recorded amount on recording sheet 30 and with each bite button 50 would be depressed to increment the display 40 to the next bite. The user then chews at a slow cadence in pace with the flashing decimal light 60. If the user finishes chewing his bite before a steady indication of the decimal light 60 comes on, then he has taken too small a bite. If the user has food in his mouth when the steady indication of the decimal light 60 goes on, then he has taken too large of a bite. In either case, the flashing cadence of the decimal light 60 and the subsequent steady indication provide instantaneous cueing and feedback to the user, regulating not only the pace of eating but also the amount of each bite. Furthermore, the act of pushing button 50 is an exercise during the meal which breaks the eating chain. Furthermore, by reviewing his given limits prior to eating each meal, the user is conditioned prior to eating to reduce weight. Finally, the cueing apparatus 10 provides a familiar object present on the table, while the user is eating, to remind the user of weight reduction.

FIG. 2 illustrates, the timing sequence for operation of the weight control apparatus 10 of the present invention. The decimal light 60 is turned on whenever the wave 200 goes high. Therefore, after button 50 is released, the decimal light 60 is turned on by pulse 220 which conveys information to the user to commence his first chew. The chew lasts approximately 0.2 second, and a dead time of 0.65 second is incurred before the decimal light 60 becomes activated for the next chew indication. The length of chewing time is preferably 0.2 second, but it may be varied up to 0.5 seconds. The chew indication pulses in wave 200 continue until preferably 25 chew indications have elapsed. Then, the decimal light 60 becomes activated steadily and remains steadily activated until button 50 is depressed and released. In the preferred embodiment, 25 chews per bite are used, but, as will become more apparent in the ensuing discussion, this number can be varied to any number. Once the steady indication 220 of wave 200 has gone high, the user is notified that the bite is to be finished.

A preferred embodiment for the electronic circuitry of the apparatus 10 of the present invention is shown in FIG. 3. Push button 50 has one pole connected to positive voltage over lead 300 which interconnects, when pushed, to lead 302 through resistor 304 to ground and is further connected to one input of NOR-gate 306. The push button switch also provides positive voltage from lead 300 over lead 308 through resistor 310 to ground and to one input of NOR-gate 312. NOR-gates 306 and 312 are interconnected into a flip-flop arrangement, so that the output of NOR-gate 306 over lead 314 is delivered to the remaining input of NOR-gate 312 and the output of NOR-gate 312 over lead 316 is delivered to the remaining input of NOR-gate 306. Lead 314 is connected to one input of NOR-gate 318, to the CLK input of chip 320 and through capacitor 316 to pin 6 of chip 322 and to resistor 319 to positive voltage. The output of NOR-gate 312 is delivered over lead 316 to one input of NAND-gate 324. As will be subsequently discussed, the outputs appearing on leads 314 and 316 serve to enable various portions of the cueing circuitry of the present invention. Specifically, when push button 50 is depressed, a high is delivered on leads 302 and 308 and the outputs of NOR-gates 306 and 312, of necessity, go low. The low output on lead 316 disables NAND-gate 324, so that the output of NAND-gate 324 is always high. The low appearing on lead 314 accesses pin 6 of chip 322 through capacitor 317.

The timing for the cueing device 10 of the present invention is provided by chips 322 and 326. Chip 322 is a conventional model number 556 timing chip manufactured by numerous commercial suppliers and is interconnected as indicated to provide the output pulse shown by wave 328. The output wave 328 on lead 330, emanating from pin 5 of chip 322, determines the length of the time during which a bite should be chewed. This output wave 328 is generated by connecting pins 4 and 14 to positive voltage, pins 1 and 2 to an RC network comprising potentiometer 332 connected at one end to positive voltage and the other end of which is connected in series through resistor 334 and connected to pins 1 and 2 of chip 322 as well as being coupled over capacitor 336 to ground. Appropriate adjustment of potentiometer 332 causes wave 328 to be high during the bite length of time. The preferable components for the timer 322 are as follows:

Potentiometer 322—1 M ohm
Resistor 334—200 K ohms Capacitor 336—0.47 uF

In a similar manner, timer 326 generates output pulses as shown by wave 340 on lead 342. Output pulses 340 correspond to the chew rate, and each positive going pulse is preferably 0.2 second in duration while the dead time is preferably 0.65 second. The interconnections to chip 326, which is also a model 556, are as follows. Pin 10 is connected to positive voltage, pin 13 is connected through resistor 344 and potentiometer 346 to positive voltage and is further connected through resistor 348 to pins 12 and 8 and further interconnected, through capacitor 350 to, ground. Adjustment of potentiometer 346 results in changing the chew rate. Typical values for the components are:

Potentiometer 346—500 K ohms
Resistor 344—22 K ohms
Resistor 348—47 K ohms
Capacitor 350—10 mF It is to be noted that timer 326 continuously outputs waveform 340 on lead 342 to one input of NAND-gate 352. However, the output of timer chip 322 on lead 330 occurs only when the input at pin 6 goes from a low to a high transition. Therefore, when button 50 is pushed in, a low appears at the input of pin 6 to disable the timer 322. The instant the button 50 is released, the timer 322 becomes activated. The waveform 328 on lead 330 accesses the remaining input to NAND-gate 352. Therefore, whenever the waveform on lead 330, as indicated by wave 328, becomes high, gate 352 is activated to extend through to its output on lead 354 the chew rate pulses on lead 342. Upon releasing button 50, the output of NOR-gate 312 on lead 316 goes high, enabling NAND-gate 324 to extend the chew rate pulses through to lead 360. Lead 360 is interconnected with resistor 362 to access the base of transistor 364. The base of transistor 364 is further interconnected through resistor 366 to positive voltage. The emitter of transistor 364 is connected to positive voltage and its collector is connected over lead 368 to the two decimal point inputs of display chips 370 and 372 by accessing resistors 374 and 376, respectively. The chew rate pulses appearing on lead 360 are extended into the base of transistor 364 to selectively turn on and turn off the decimal point of the seven segment displays 370 and 372.

When power is initially turned on for the device 10 of the present invention by activating switch 45, power is delivered over lead 380 through a resistor 382, paralleled by a capacitor 384, and through resistor 386 to ground. The junction between resistors 382 and 386 is connected through resistor 388, through an inverter 390, through a second inverter 392 and over lead 394 to the reset of chips 396 and 320. Lead 394 is further connected to the remaining input of NOR-gate 318. When power initially goes up, the capacitor 384 initially acts as a short, causing a voltage to appear across resistor 386 and thereby causing the output of gate 390 to go low and the output of gate 392 to go high. A high level on lead 394 causes both chip 320 and 396 to reset. However, capacitor 384 charges through resistor 386 to a potential causing the voltage across resistor 386 to be substantially at ground level, thereby causing the output of inverter 390 to go high and the output of inverter 392 to go low. A low value on lead 394 causes chips 320 and 396 to operate without being reset. A low on 394 further causes NOR-gate 318 to be enabled.

Chips 320 and 396 are conventional up-counters commercially available from RCA as Model No. CD4518. Chip 320 is enabled to positive voltage and is receptive of an input at the clock pin CLK. Whenever the button 50 is pushed, a low appears on lead 314 to the clock input of 320. This low enables the counter to increment. When the counter 320 increments to its full capacity, a carry is delivered over lead 398 into the enable of chip 396. In this fashion, a count can be performed from a decimal 0 to a decimal 99. The outputs of chips 320 and 396 are delivered into conventional decoder, latch and drive circuits 400 and 402. Chips 400 and 402 are conventional seven segment decoders, such as that manufactured by RCA as CD4511B, and are under control of lead 401 from inverter 403. Inverter 403 is controlled by NOR-gate 318 over lead 405. The outputs of chips 400 and 402 conventionally drive the seven segments of displays 370 and 372.

In operation whenever push button 50 is pushed, lead 314 goes low, causing the output of NOR-gate 318 to go high. Due to the influence of inverter 403, the value on lead 401 goes low, thereby activating the operation of chips 400 and 402. As long as button 50 is depressed, the display 370 and 372 is on, showing the cumulative total of bites for that meal. The release of button 50 also caused the counters 320 and 396 to increment, the display 40 goes out and, as mentioned, the cadence light 60 commences to flash. The pressing of button 50 does not increment counter 320, since pin 6 of chip 322 must be high and that only occurs when the steady indication is on.

In operation, a person should adhere to the following guidelines. The person should always eat in the same place everyday, using a small dinner plate, and a standard teaspoon, fork, and knife. Such utensils should always be used even when eating sandwiches, fruit, etc. The user should only concentrate on eating and should not do anything else such as watching TV, listening to the radio, or reading. After eating, the user should immediately leave the table.

In order to use the method and apparatus of the present invention, the user must first establish the average number of bites he will normally take at breakfast, lunch, supper and for snacks. This is accomplished by using the behavior control apparatus 10 of the present invention to count the number of bites over each of the meals for a period of time which is preferably three to seven days. As each bite for the meal is taken and completed, the user pushes the button 50 to increment the counter 40. As each meal is completed, the number of bites are recorded on a worksheet. After seven days, the average number of bites per meal is calculated over the seven day period. The user then deducts one bite from the average for each meal. The resulting numbers are his bite limits for the first week of behavioral control. These numbers are written on the chart 30.

The only additional recordkeeping which may be done beyond recording the daily "bite limit" is to maintain a daily or weekly weight record. The user may weigh himself each morning or each week before dressing, but after voiding as the weight is at its lowest point at this time. If, at the end of the first full week of eating the reduced number of bites each day (i.e., one less biteful per meal), the user has not lost one to two pounds, he should subtract one more biteful from each meal for the next week. If, however, he has lost more than two pounds, he should add one bite to one of the daily meals for the next week. Of course, weight maintenance and weight gain can be accomplished by maintaining a bite limit and by increasing the bite limit, respectively.

The operational sequence for the apparatus 10 of the present invention will now be described. The user who is seated at the table, and who is ready to begin eating, switches the power for the apparatus 10 on. The display illuminates the digits 0-0 for approximately ½ second before automatically extinguishing. The chew rate light 60 illuminates simultaneously with the extinguishing of the display. The user places the first bite of food in his mouth and presses the button 50. The display illuminates to 0-1 and remains illuminated as long as the button 50 is depressed. The chew rate display 60 is extinguished as long as the button, is depressed. The user releases the button and the bite display is extinguished. Simultaneously, the chew rate display begins pulsing in a regular cycle of 0.2 second illuminated and 0.65 second not illuminated. The user chews his food in cadence with the flashing of the chew rate display 60. After twenty-five chews have elapsed, the chew rate display 60 stops pulsing and is steadily illuminated. This indicates to the user that the next bite may be taken and that chewing and swallowing of the previous bite should be completed. The user varies the size of the next bite to complete chewing and swallowing at the same time as the chew rate display changes from a pulsing to a steadily illuminated condition. The user places the next bite of food in his mouth and the process repeats. The user observes the number of each bite as it is displayed and compares it with the prerecorded bit limit indicated on the chart 30. He stops taking bites when the bite display equals the value on the chart. The user turns the power switch off to deactivate all functions when the bite limit has been reached, or the user may allow the power to be maintained on in order to record the cumulative number of bites for all meals during one or more days.

By using the method and apparatus of the present invention, a person may (1) maintain weight, (2) reduce weight, (3) add weight, or (4) control the rate at which food is eaten.

Although the present invention has been described with a certain degree of particularity, it is understood that the present disclosure has been made by way of example and that changes in details of structure may be made without departing from the spirit thereof. For example, while the display 40 increments with each bite, a suitable display can be designed to decrement from a predetermined number. Furthermore, the display may be accomplished by mechanical or other electrical means such as light emitting diodes, liquid crystals, a numbered wheel, or similar electrical or mechanical means. The use of a push button 50 to alter the display 40 may also be accomplished by levers, wheels, or other electrical or mechanical means. Such inputs may be operated by one or more fingers, or other parts of a user's body or by tools such as a fork, spoon, knife, or similar means. Indeed, other alternative input means may be light, sound, or other radiation. A sound input may be a word, combination of words, tone, or combination of tones whether audible or not. Such inputs may be vocally generated or generated by other means. While a chart 30 has been designed for recording the "bite limits", information to be displayed may be entered by the user using a writing instrument, by setting a dial, pointer, number wheel, counter, activating a push button, other manual means or by some intermediate method such as magnetic tape or other programmed input. The chart 30 may be accomplished by an electronic display wherein the numbers are entered into a memory for later display during the meal.

I claim:
1. Weight control apparatus comprising:
   means for yielding to a user a representation of a succession of signals repeating with a frequency pre-selected to correspond with a desired rate of chewing of food by the user;
   means for measuring a pre-selected time interval that corresponds with a desired length of time for chewing a bite of food;

means for energizing said yielding means and said measuring means;

means, including a visable character display, for indicating the termination of said time interval as determined by said measuring means;

manually-operable switch means for activating said yielding means and said measuring means;

and means for indicating said termination of said time interval as a steady-state energization of said visible character display.

2. Weight control apparatus comprising:

means for yielding to a user a representation of a succession of signals repeating with a frequency pre-selected to correspond with a desired rate of chewing of food by the user;

means for measuring a pre-selected time interval that corresponds with a desired length of time for chewing a bite of food;

means for energizing said yielding means and said measuring means;

means, including a visable character display, for indicating the termination of said time interval as determined by said measuring means;

manually-operable switch means for activating said yielding means and said measuring means;

and means for incrementing displayed numbers that correspond to the number of successive operations of said switch.

3. Apparatus as defined in claim 2 in which said numbers as incremented are displayed upon depression of said switch.

4. Weight control apparatus comprising:

means for yielding to a user a representation of a succession of signals repeating with a frequency pre-selected to correspond with a desired rate of chewing of food by the user;

means for measuring a pre-selected time interval that corresponds with a desired length of time for chewing a bite of food;

means for energizing said yielding means and said measuring means;

means, including a visable character display, for indicating the termination of said time interval as determined by said measuring means;

manually-operable switch means for activating said yielding means and said measuring means;

and means for displaying said signals during said time interval, said character display exhibiting both numbers and a different representation and said signals being exhibited by said different representation.

5. Apparatus as defined in claim 4 in which said different representation is entirely separate from the formation of said numbers.

6. Apparatus as defined in claim 4 which includes means for indicating said termination of said time interval as a steady-rate display of said different representation.

7. Weight control apparatus comprising:

means for yielding to a user a representation of a succession of signals repeating with a frequency pre-selected to correspond with a desired rate of chewing of food by the user;

means for measuring a pre-selected time interval that corresponds with a desired length of time for chewing a bite of food;

means for energizing said yielding means and said measuring means;

means, including a visable character display, for indicating the termination of said time interval as determined by said measuring means;

manually-operable switch means for activating said yielding means and said measuring means;

means for displaying said signals during said time interval;

and means for indicating said termination of said time interval as a steady-rate display of said displaying means.

8. Weight control apparatus comprising:

means for yielding to a user a representation of a succession of signals repeating with a frequency pre-selected to correspond with a desired rate of chewing of food by the user;

means for measuring a pre-selected time interval that corresponds with a desired length of time for chewing a bite of food;

means for energizing said yielding means and said measuring means;

means, including a visable character display, for indicating the termination of said time interval as determined by said measuring means;

manually-operable switch means for activating said yielding means and said measuring means;

and means for displaying the cumulative total of the number of successive ones of said time intervals in correspondence with the end of any given one of said time intervals.

9. Apparatus as defined in claim 8 in which a next successive accumulated number is displayed upon operation of said switch following the end of each given one of said time intervals.

10. An apparatus for use by a person in controlling his eating behavior, said apparatus comprising:

a switch having a first state and a second state, said switch being activatable between said first and second states by a person in connection with said person placing a bite of food in said person's mouth and said person commencing chewing of said bite of food;

means responsive to the transition of said switch between said first state and said second state for transmitting to said person repetitive signals, said repetitive signals having a pre-selected frequency which represents a desired rate of chewing and continuing for a pre-selected time interval which represents a desired time duration for chewing said bite of food;

and means for inhibiting said transmitting of said signals at the termination of said time interval following said transition, said time interval representing a pre-selected time duration for a set number of chews in said bite.

11. Apparatus as defined in claim 10 in which said switch includes a pushbutton and is activatable to a momentary ON state from a normally OFF state, said responsive means initiating said transmitting of said repetitive signals upon transition of said switch between said ON and OFF states.

12. Apparatus as defined in claim 11 in which said responsive means initiates said transmitting of said repetitive signals upon transition of said switch from said ON state to said OFF state.

13. Apparatus as defined in claim 10 in which said signals exhibit a constant frequency, in which said responsive means transmits substantially twenty-five repetitions of said signals, and in which said inhibiting means terminates said transmission of said signals after the transmission of the last of said repetitions.

14. Apparatus as defined in claim 13 in which the period of each of said signals is between 0.2 and 0.5 second.

15. Apparatus as defined in claim 10 which further includes:
a counter;
means responsive to activation of said switch between said first and second states for incrementing said counter;
and means operative in response to said incrementing of said counter for displaying the cumulative total of the number of incrementations of said counter.

16. Apparatus as defined in claim 15 in which said operative means displays said cumulative total in response to activation of said switch to said first state.

17. Apparatus as defined in claim 16 which still further includes means for precluding further incrementing of said counter prior to said termination of said time interval.

18. Apparatus as defined in claim 10 which further includes means for precluding interruption of said transmitting of said signals prior to said termination of said time interval.

19. Apparatus as defined in claim 10 which further includes means for displaying a pre-selected desired number of bites per meal.

* * * * *